Nov. 20, 1962   H. R. CHAPLIN, JR   3,064,927
RETRACTABLE AUXILIARY LEADING EDGE FOR HIGH-SPEED WINGS
Filed Aug. 21, 1959   3 Sheets-Sheet 1

INVENTOR
HARVEY R. CHAPLIN, JR.
BY
ATTORNEYS

United States Patent Office 3,064,927
Patented Nov. 20, 1962

3,064,927
RETRACTABLE AUXILIARY LEADING EDGE FOR HIGH-SPEED WINGS
Harvey R. Chaplin, Jr., Arlington, Va., assignor to the United States of America as represented by the Secretary of the Navy
Filed Aug. 21, 1959, Ser. No. 835,374
5 Claims. (Cl. 244—42)
(Granted under Title 35, U.S. Code (1952), sec. 266)

The invention described herein may be manufactured and used by or for the Government of the United States of America for governmental purposes without the payment of any royalties thereon or therefor.

This invention relates to a retractable auxiliary leading edge for high-speed wings and more particularly to a method and apparatus for increasing the coefficient of lift of a supersonic airfoil at low speeds without compromising the performance of the aircraft at supersonic speeds.

Supersonic or high speed wings generally have sharp leading and trailing edges with a thin central section having a small amount of camber to provide the minimum necessary lift and drag during flight. During takeoff or landing operations where a high coefficient of lift at large angles of attack is desired, the sharp leading edges of these high speed wings separate the airflow over the wing so that a bubble of high pressure air is created on the upper surface of the wing as soon as the angle of attack of the wing becomes large enough to provide the required low speed lift.

This separation bubble decreases the lift of the wing so that the wing will quickly stall out and provide very little lift.

In the past various devices have been used on low speed wings such as leading edge flaps, slots, variable wing extensions or camber, and boundary layer control by suction or blowing.

These methods are of limited effectiveness on high speed, sharp leading edge wings since the separation bubble forms at the forward, sharp leading edge where there is no space to install flaps or nozzles.

A primary purpose of this invention is therefore to provide a retractable auxiliary leading edge for a high speed wing which is extended to the sharp leading edge of the wing for increasing the lift of the wing at low speeds and which may be retracted into the thicker section of the wing for high speed operation with a minimum of drag.

Another object of the invention is to provide a leading edge duct for a wing which is adapted to distribute compressed air over the leading edge of a supersonic wing to increase the low speed lift and allow larger angles of attack to be used.

Another object of this invention is to provide a retractable leading edge for a supersonic wing which provides a large increase in low speed lift and allowable angles of attack when used with other lift producing devices such as trailing edge flaps.

Other objects and features of the invention will become apparent to those skilled in the art as the disclosure is made in the following detailed description of a preferred embodiment of the invention as illustrated in the accompanying drawings in which.

Figure 1:
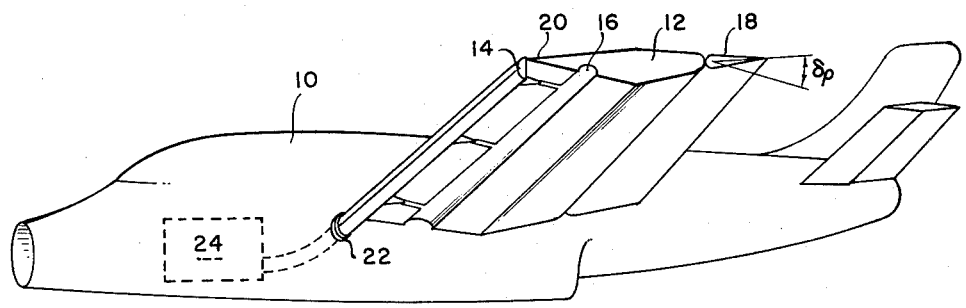
FIG. 1 is a perspective view of a supersonic airplane with the retractable auxiliary leading edge in the extended position.

Referring now to the drawings, wherein like reference characters designate like or corresponding parts throughout the several views, there is shown in FIG. 1 (which illustrates a preferred embodiment) a supersonic airplane 10 having a wedge or diamond-shaped supersonic wing 12 with a retractable auxiliary leading edge 14 in the extended position along the leading edge 20 of the wing 12. A retracting slot 16 is formed in the lower part of the wing 12 to provide a storage compartment for the auxiliary leading edge 14.

A conventional aileron or flap 18 forms part of the trailing edge of the wing 12.

Before take-off or landing the auxiliary leading edge 14 is extended from the slot 16 to the wing leading edge 20 where it engages a pipe coupling 22 which is connected to a compressor 24 that may be part of a jet engine (not shown). The compressor 24 forces a high speed jet of air out of the auxiliary leading edge 14 and over the leading edge 20 of the wing 12 to dissipate the separation bubble which is formed at the critical angle of attack.

Figure 2:
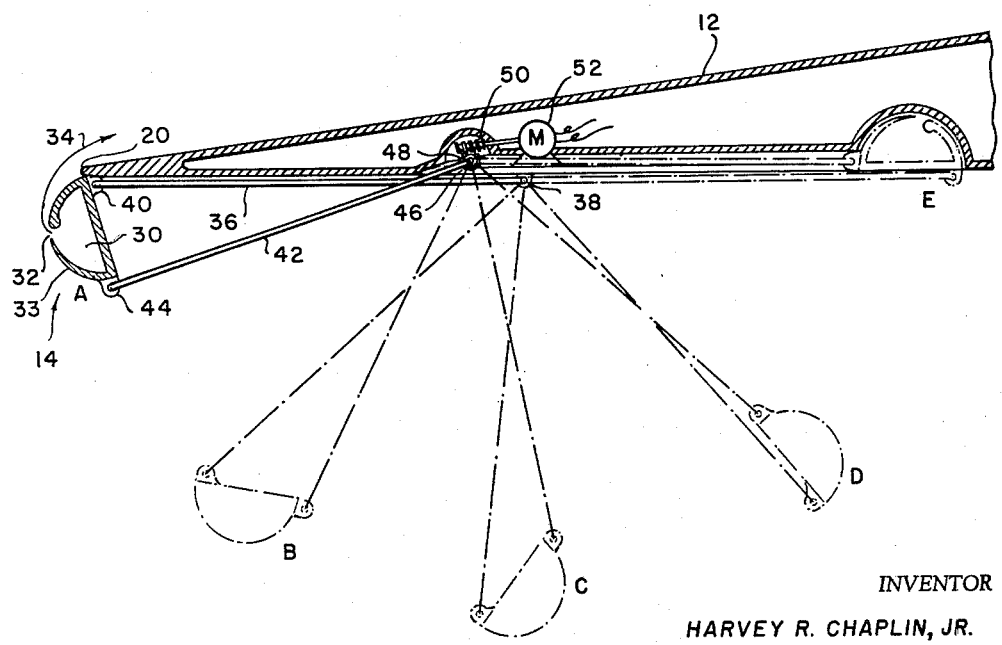
FIG. 2 is a cross-section view of a preferred embodiment of the retracting mechanism and the auxiliary leading edge.

A preferred embodiment of the invention is shown in cross-section in FIG. 2 where the auxiliary leading edge 14 is shown as a semi-cylindrical duct 30 having a nozzle 32 in the curved side 33 to project a jet 34 of high speed air past the leading edge 20 and along the upper surface of wing 12.

A pivoting link 36 is connected between wing pivot 38 and first duct pivot 40 on duct 30. Link 42 is connected between a second duct pivot 44 and a second wing pivot 46. A gear 48 attached to link 42 is driven by worm 50 and a reversible electric motor 52 to retract duct 30 from extended position A to positions B, C, D, and E (retracted position).

Link 36 turns the duct 30 during retracting so that the curved surface 33 and nozzle 32 are inserted in curved slot 16 in the retracted position with the flat surface of duct 30 forming the lower edge of wing 12.

The retracting mechanism thus provides a means for extending duct 30 out to the sharp leading edge 20 and for retracting the duct 30 back into the thicker portions of the wing 12 to provide excellent streamlining at supersonic speeds. The preferred embodiment is shown in FIG. 2 where, in the retracted position E, only link 36 and pivots 38 and 40 extend into the slip stream over the lower surface of the wing. Pivots 38 and 40 should be as small and as streamlined as possible in view of the physical strength required.

As shown in FIG. 1 a plurality of links 36 and 42 may be required if the duct 30 extends across the total wing span.

Figure 3:
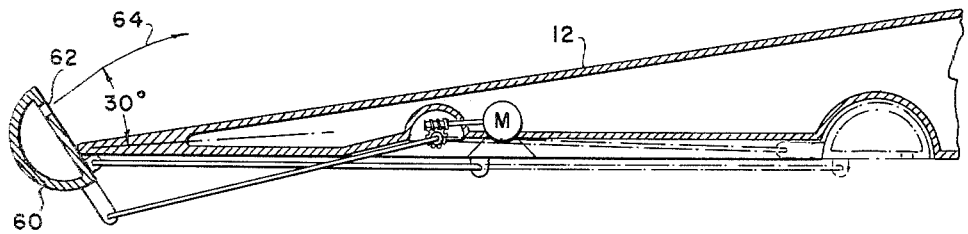
FIG. 3 is a cross-section view of another embodiment of the auxiliary leading edge.

Another form of the invention is illustrated in FIG. 3 where a semi-cylindrical duct 60 is shown in the extended position having an opening 62 for exhausting a high speed jet of air 64 over the upper surface of wing 12. The retracting mechanism is identical with that shown in FIG. 2 to allow retraction of duct 60 into wing 12.

Figure 4:
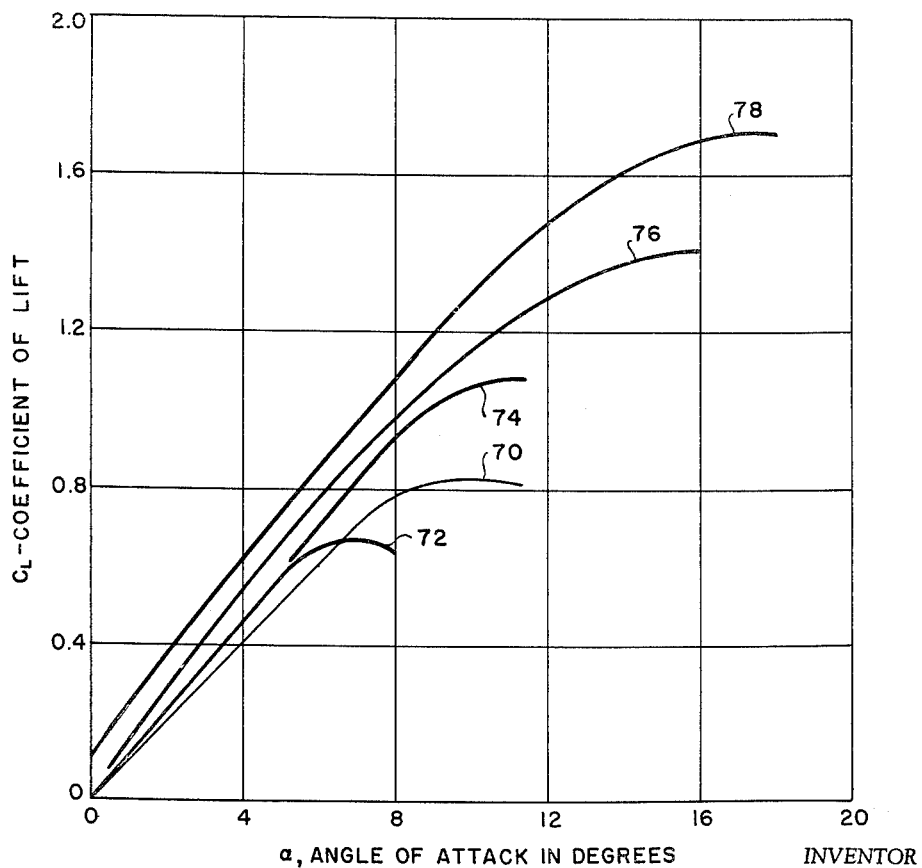
FIGS. 4 and 5 are graphs of the performance of the auxiliary leading edge of FIG. 3.
Figure 5:
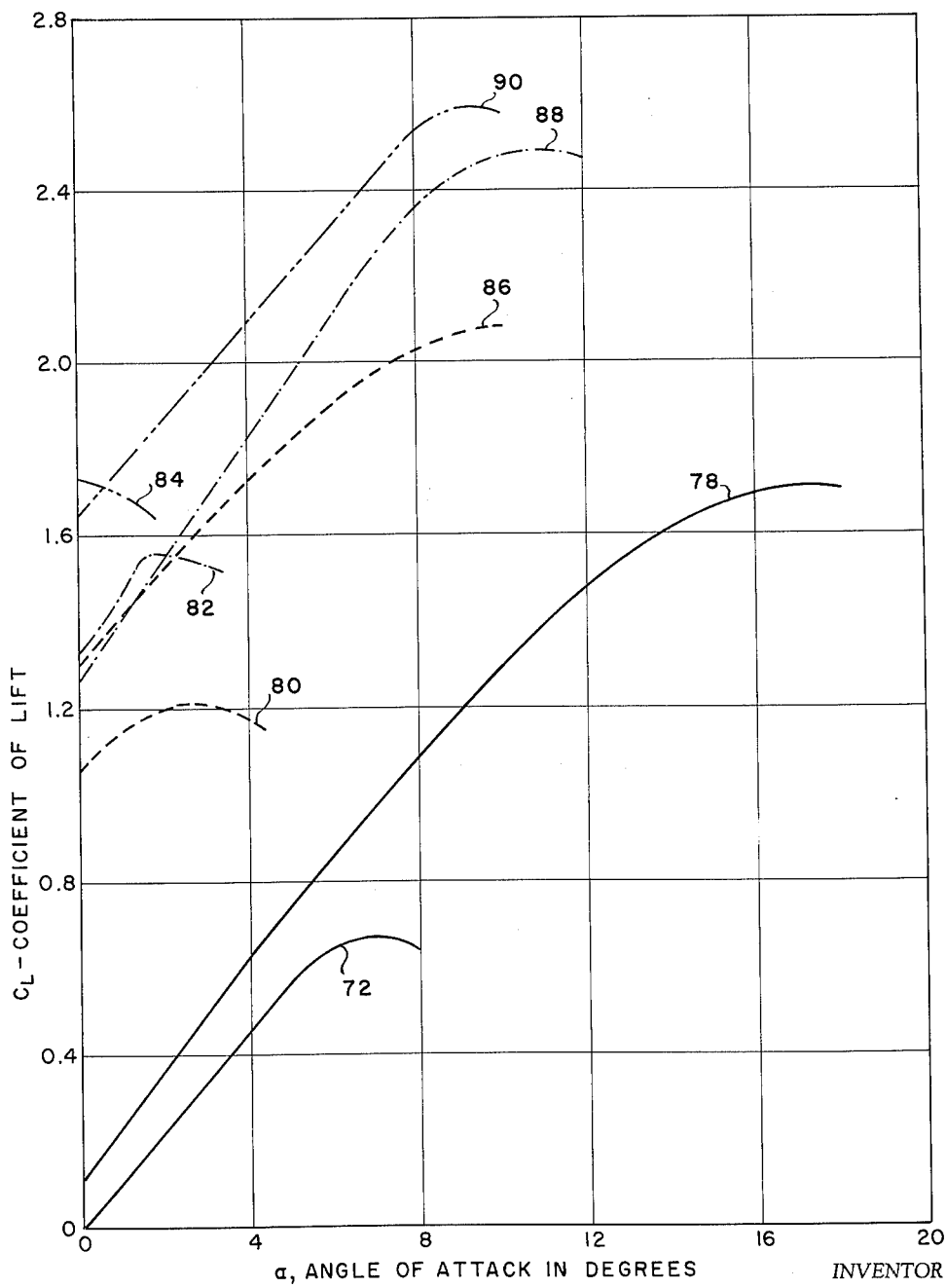

The improvement in lift of thin wings obtained by the use of the retractable auxiliary leading edge can be shown more clearly by reference to FIGS. 4 and 5 which are test results of a 5% thickness ratio biconvex wing having a chord length of 10 inches and a maximum thickness of ½ inch with an auxiliary leading edge as shown in FIG. 3 having a ½ inch diameter (length of flat surface). Opening 62 is directed at an angle of 30° above the centerline of the wing 12 and is ¼ inch away from the leading edge 20 of wing 12 for optimum results. Opening 62 consists of a plurality of .045 inch diameter holes spaced every .763 inch along the length of the duct 60.

As shown in FIG. 4 where the coefficient of lift, $C_L$, is plotted to an arbitrary scale against the angle of attack, $\alpha$, curve 70 is a plot of the lift of the biconvex wing without the auxiliary leading edge. Curves 72, 74, 76, and 78 are shown for the biconvex wing with the auxiliary leading edge in the extended position and with an air jet 64 having momentum coefficients, $C_u$, of 0, .047, .094, and .188 respectively.

The momentum coefficient, $C_u = wVj/gqS$ where $w$ = quantity of air in pounds per second
$Vj$ = jet exit velocity in feet per second assuming isentropic expansion to atmospheric pressure
$g$ = acceleration due to gravity in feet per second squared
$S$ = wing area in square feet
$q$ = dynamic pressure in pounds per square feet ($pV^2/2$)
$p$ = mass density of air in slugs per cubic foot
$V$ = air speed in feet per second.

The lift tests were conducted at a dynamic pressure of 12.5 pounds per square foot, corresponding to an air speed of 61 knots and a Reynolds number of about 550,000, based on the model chord of .833 foot.

A separation bubble forms on the forward upper surface of the wing until, at an angle of attack slightly larger than the critical angle or the angle having maximum lift, this bubble breaks away from the leading edge entirely at the stall angle.

As shown by curves 74, 76, and 78, the addition of the auxiliary leading edge and air jet increases the lift by a factor of 2 or more and allows a large increase in the angle of attack. These large angles of attack of more than 10° increase the drag of the wing to help slow the plane down, as during a landing operation.

Significant increases in lift may be achieved when the auxiliary leading edge is used with conventional flaps as shown in FIG. 5. For this data a full flap of 2.5 inches chord length was used with the ten inch wing as in FIG. 4.

Curve 72 from FIG. 4 shows the lift at various angles of attack for the biconvex wing with a flap angle of zero and $C_u = 0$. Curves 80, 82 and 84 show the increase in lift for flap angles of 20°, 40°, and 60°. However, the increase in lift at large flap angles is achieved only at small angles of attack.

The addition of the air jet is shown by curves 86, 88, and 90 for $C_u = .188$ (same as curve 78) for flap angles of 20°, 40°, and 60° respectively. The air jet in the auxiliary leading edge therefore allows significant increases in the coefficient of lift with large angles of attack if maximum drag is desired.

Furthermore, the retracting mechanism provides a means for extending an air jet duct to the thin leading edge of high speed wings and for retracting the duct into the thicker portions of the wing for high speed, low drag operation.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What is claimed is:

1. In an aircraft, a thin, high speed wing, a semi-cylindrical auxiliary duct having a nozzle for blowing air over the lifting surface of said wing, a curved slot in said wing for storing said duct, a pair of links mounted between said duct and said wing for retracting said duct into said slot and for extending said duct to the leading edge of said wing for boundary layer control, power means mounted in said wing for moving said links to retract said duct, coupling means mounted on said plane near said leading edge for connection to said duct in the extended position, and compressor means connected to said coupling means for applying air pressure to said duct for boundary layer control of said supersonic wing at low speeds.

2. A wing for a supersonic airplane, comprising a wedge-shaped leading portion having a leading edge, said wing having a retraction slot located between the leading and trailing edges of said wing, a duct having a discharge opening-means, positioning means to retract said duct into said slot and to place said duct along said leading edge with said discharge opening-means positioned to discharge air under pressure over said leading edge, and means to supply said duct with air under pressure when said duct is placed along said leading edge by said positioning means.

3. A wing as defined in claim 2 but further characterized by said duct and said slot being substantially coextensive with said wing.

4. A wing as defined in claim 2 but further characterized by said wing having a thickness ratio of 10% or less.

5. In an aircraft, a supersonic wing having a slot located between the leading and trailing edges of said wing, a duct having means for flowing air over the lifting surface of said wing, and means connected between said wing and said duct for retracting said duct into said slot of said wing for streamlining at supersonic speeds.

References Cited in the file of this patent

UNITED STATES PATENTS

| | | |
|---|---|---|
| 2,377,386 | Stalker | June 5, 1945 |
| 2,910,254 | Razak | Oct. 27, 1959 |
| 2,912,190 | MacDonough | Nov. 10, 1959 |
| 2,941,751 | Gagarin | June 21, 1960 |